United States Patent [19]
Yam

[11] Patent Number: 6,056,433
[45] Date of Patent: *May 2, 2000

[54] METHOD AND APPARATUS FOR INFRARED PYROMETER CALIBRATION IN A THERMAL PROCESSING SYSTEM

[75] Inventor: Mark Yam, San Jose, Calif.

[73] Assignee: Applied Materials, Inc., Santa Clara, Calif.

[ * ] Notice: This patent is subject to a terminal disclaimer.

[21] Appl. No.: 09/007,742

[22] Filed: Jan. 15, 1998

Related U.S. Application Data

[60] Division of application No. 08/623,433, Mar. 28, 1996, which is a continuation-in-part of application No. 08/506,902, Jul. 26, 1995.

[51] Int. Cl.⁷ .................................................. G01K 15/00
[52] U.S. Cl. .............................. 374/2; 374/131; 374/141; 250/252.1
[58] Field of Search ................................ 374/2, 131, 141; 250/252.1

[56] References Cited

U.S. PATENT DOCUMENTS

| | | | |
|---|---|---|---|
| 4,387,301 | 6/1983 | Wipick et al. | 374/2 |
| 4,544,418 | 10/1985 | Gibbons | 148/1.5 |
| 4,885,463 | 12/1989 | Wellhan et al. | 250/252 |
| 5,155,336 | 10/1992 | Gronet et al. | 219/411 |
| 5,265,957 | 11/1993 | Moslehi et al. | 374/1 |
| 5,317,492 | 5/1994 | Gronet et al. | 362/294 |
| 5,324,937 | 6/1994 | Chen et al. | 250/252.1 |
| 5,326,170 | 7/1994 | Moslehi et al. | 374/2 |

FOREIGN PATENT DOCUMENTS

| | | |
|---|---|---|
| 32 21 382 A1 | 12/1982 | Germany . |
| 34285 | 3/1979 | Japan . |
| 55-99035 | 7/1980 | Japan . |
| 55-99035 | 3/1981 | Japan . |
| 56-49929 | 5/1981 | Japan . |
| 131027 | 8/1982 | Japan . |
| 57-131027 | 8/1982 | Japan . |
| 62-022036 | 1/1987 | Japan . |
| 62-22036 | 1/1987 | Japan . |
| 2056669 | 3/1981 | United Kingdom . |
| 2101306 | 1/1983 | United Kingdom . |
| 2101306 | 12/1983 | United Kingdom . |

OTHER PUBLICATIONS

Bryant et al., "Infrared absorption measurements in the field using LED sources," Power Engineering Journal, pp. 56–60, Mar. 1992.

Pyzhkov et al., "Stable source of infrared radiation for photometer calibration," Measurement Techniques, vol. 29, No. 4., 1996.

Bryant et al., "Infrared Absorption Measurements in the Field Using LED Sources", Power Engineering Journal, pp. 56–60, Mar. 1992.

English language abstract of JP 62022036, Patent Abstracts of Japan, Jan. 1987.

*Primary Examiner*—Randy W. Gibson
*Attorney, Agent, or Firm*—Fish & Richardson

[57] ABSTRACT

A calibration instrument for calibrating a temperature probe, such as pyrometer, uses a stable light source and a filter to simulate a blackbody of a known temperature. An alignment tool aligns a light-emitting surface of the calibration instrument to the input of the temperature probe. The calibration instrument may include a fiber optic bundle to transmit light from the light source to the light emitting surface.

17 Claims, 12 Drawing Sheets

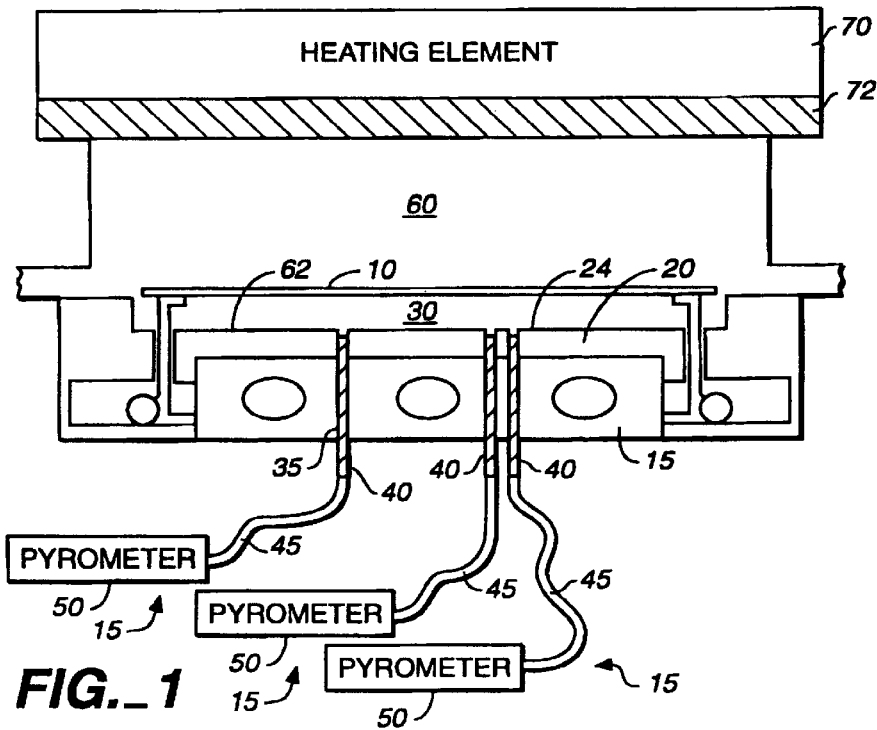
FIG._1
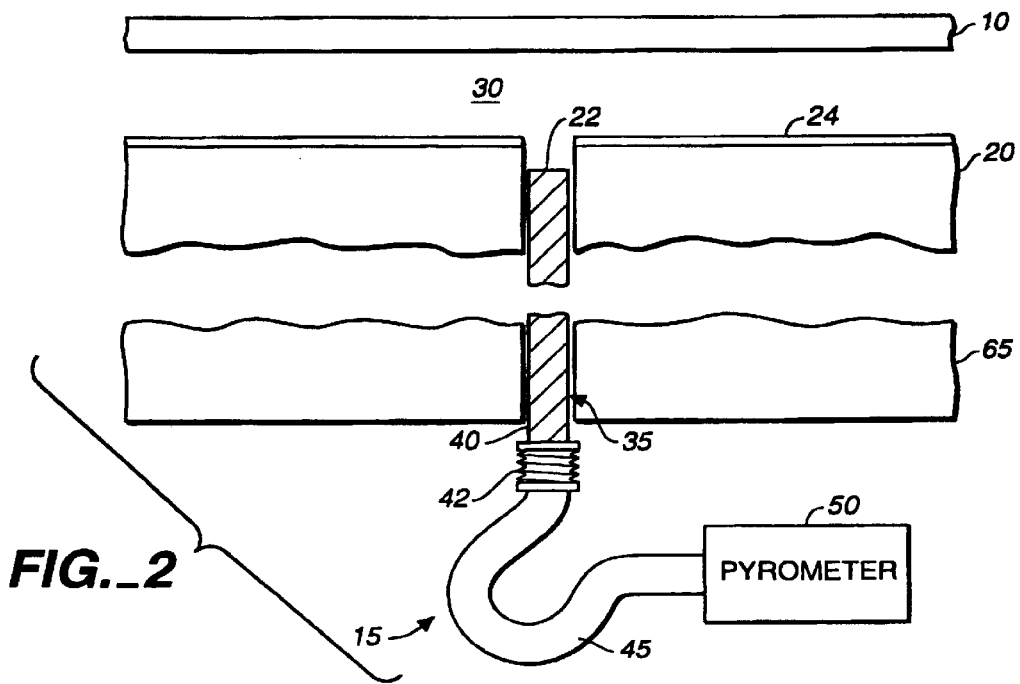
FIG._2

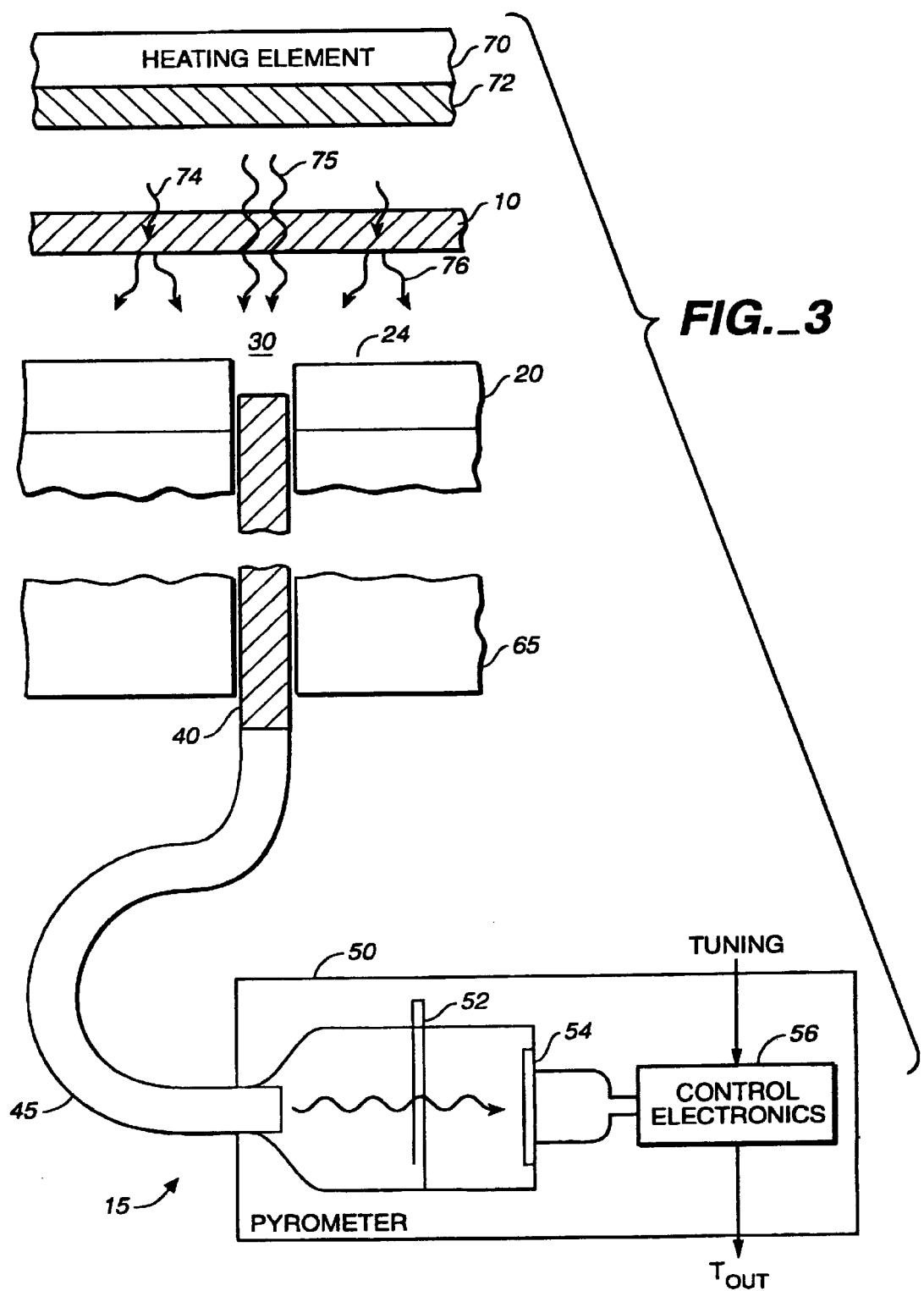
FIG._3

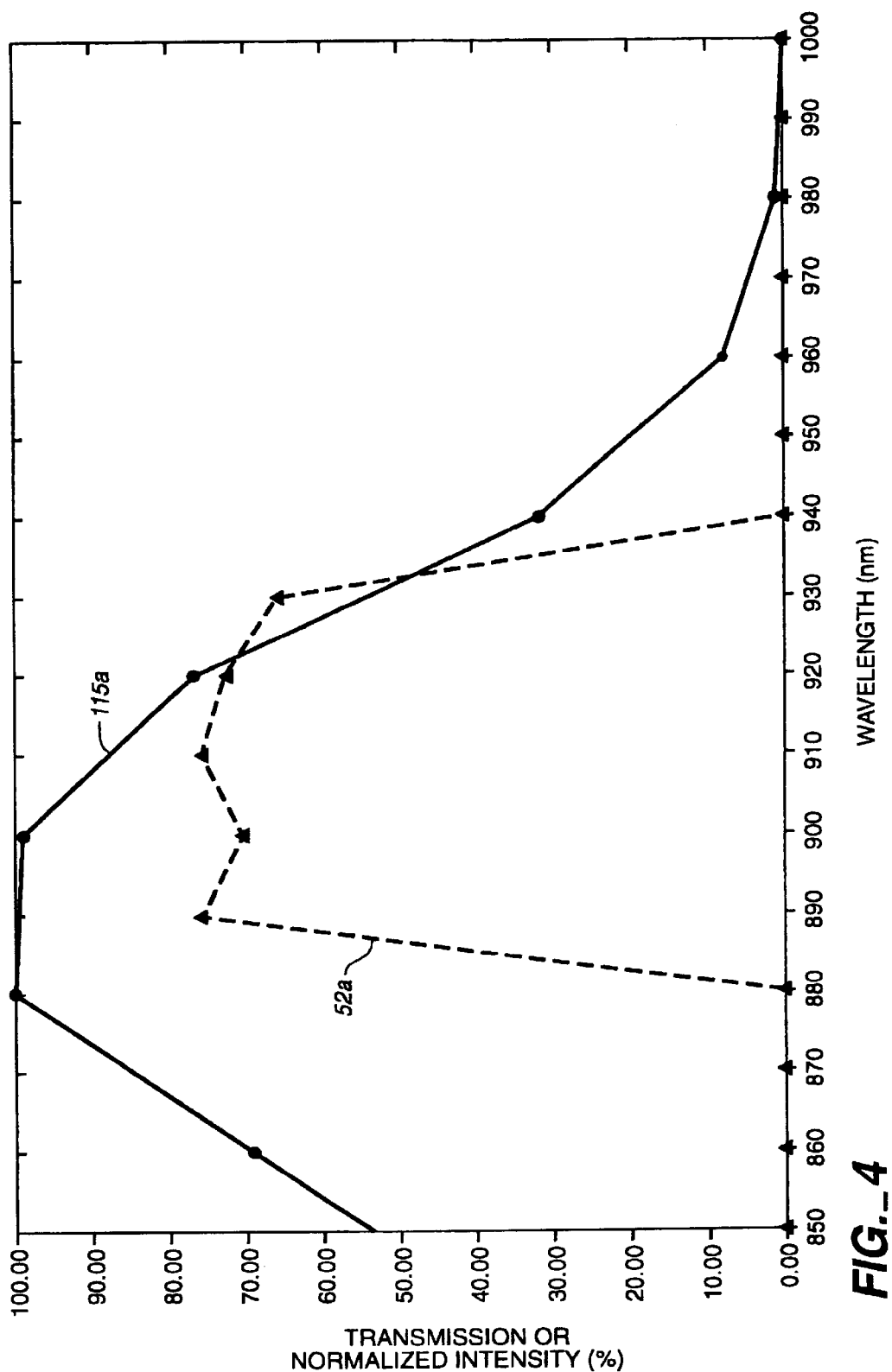
FIG._4

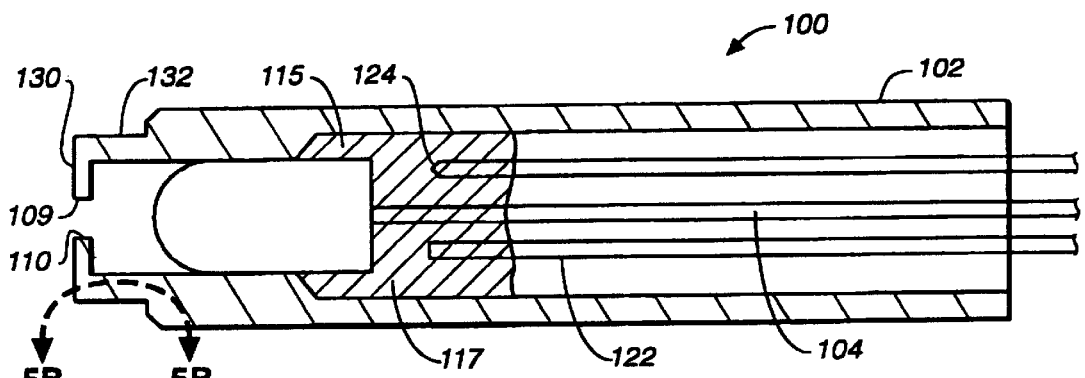
FIG._5A
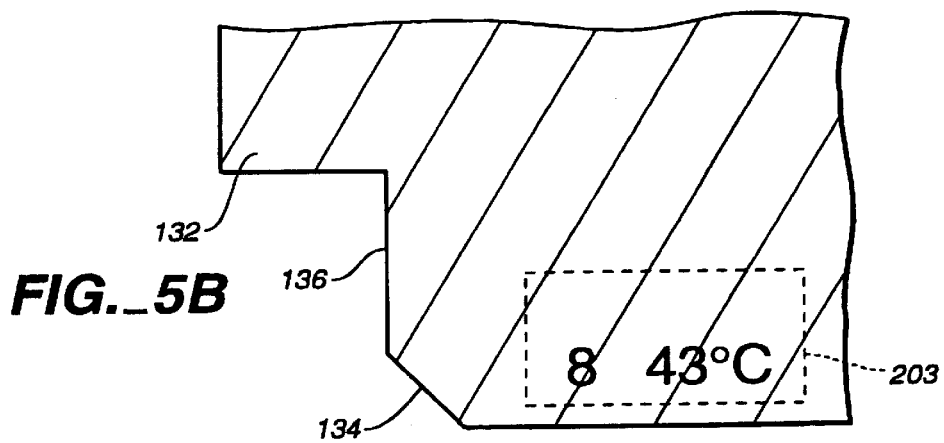
FIG._5B
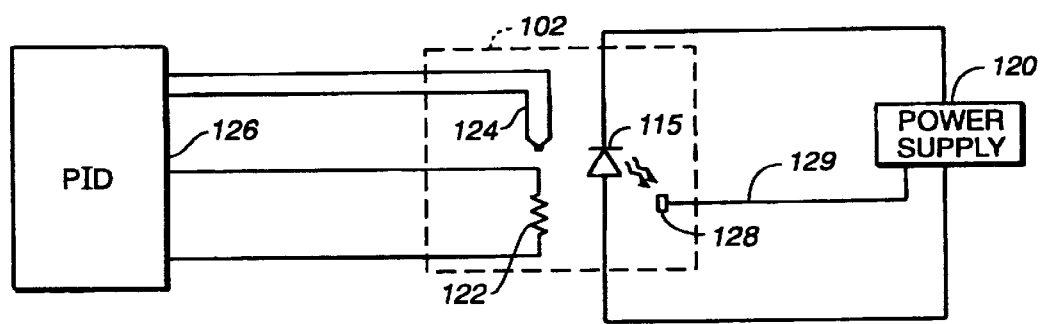
FIG._6

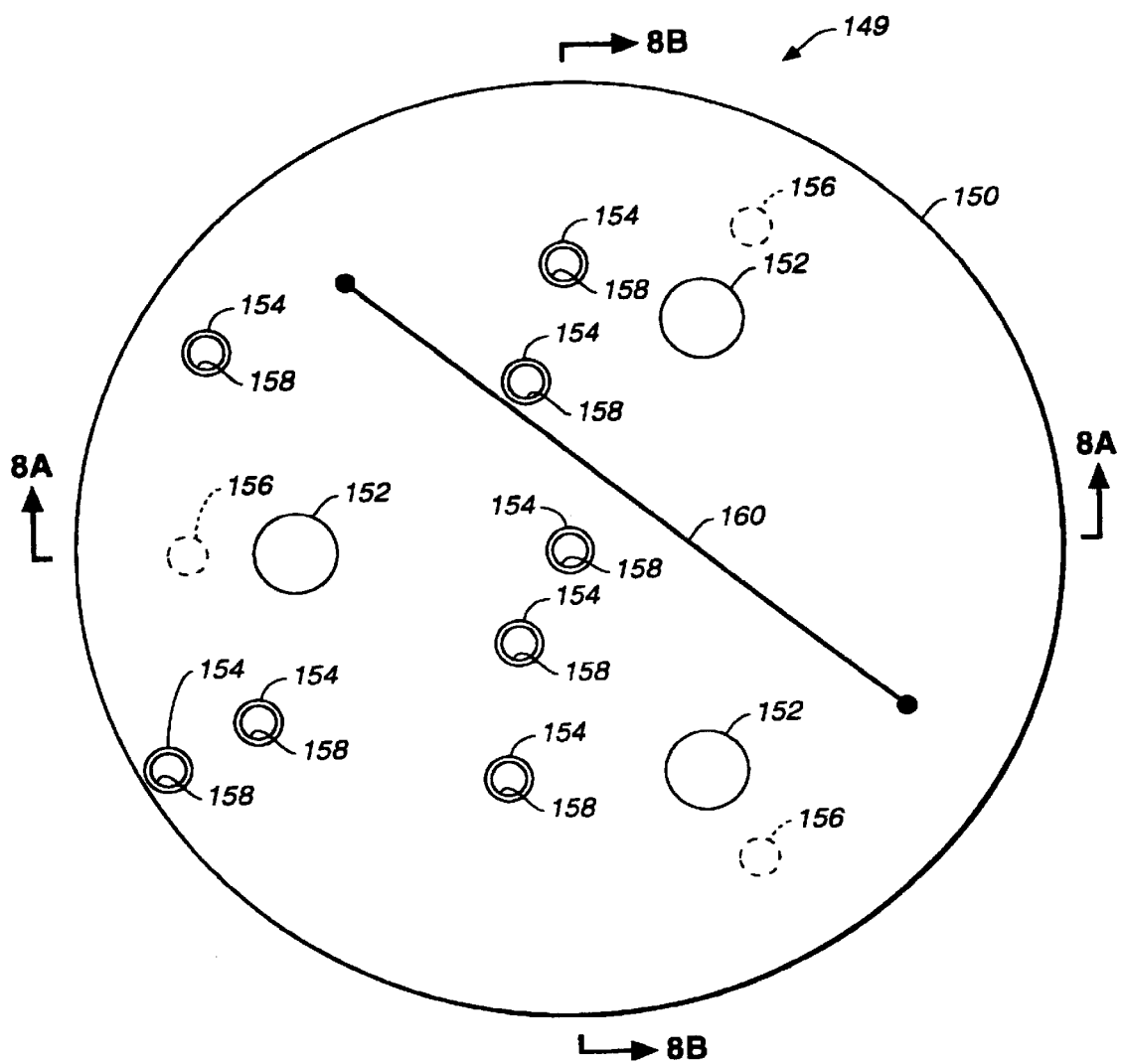
FIG._7

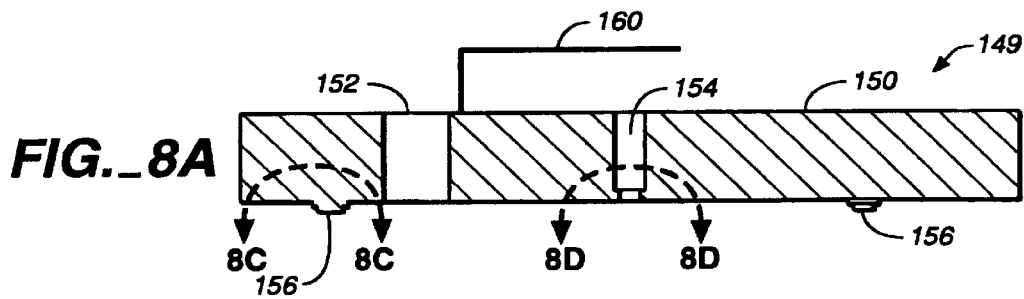
FIG._8A
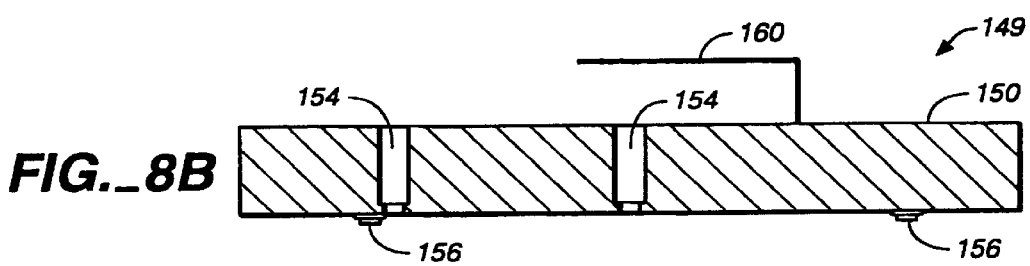
FIG._8B
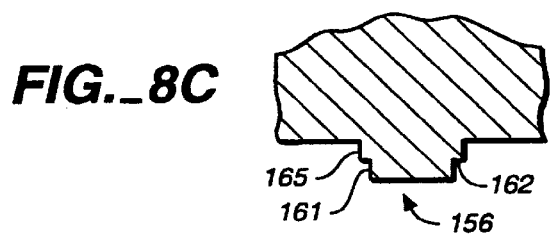
FIG._8C
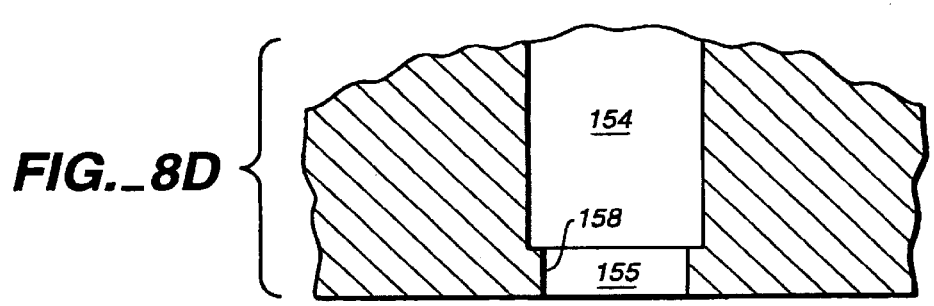
FIG._8D

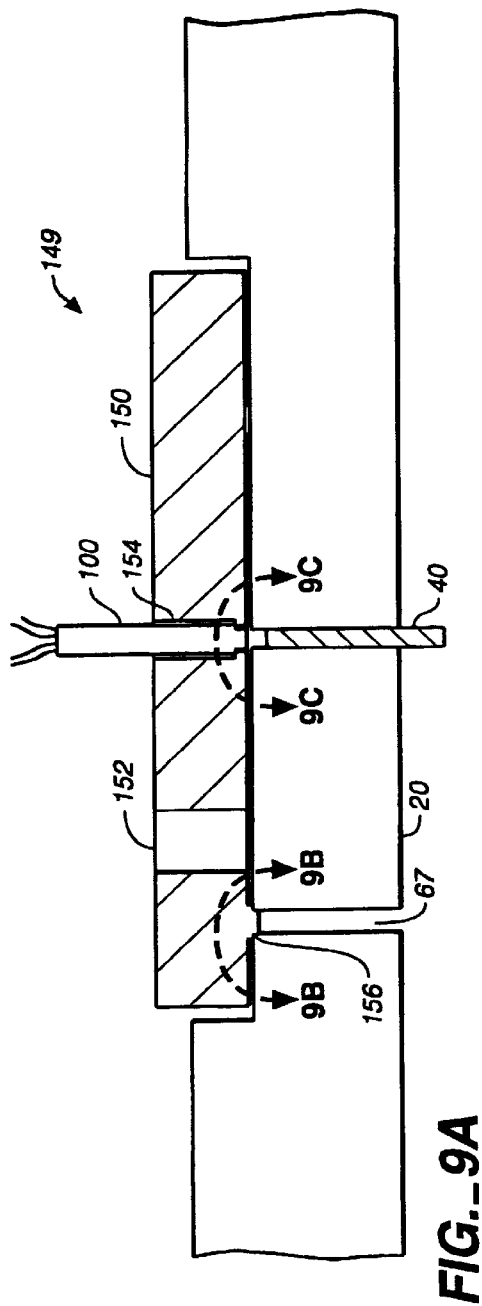
FIG._9A
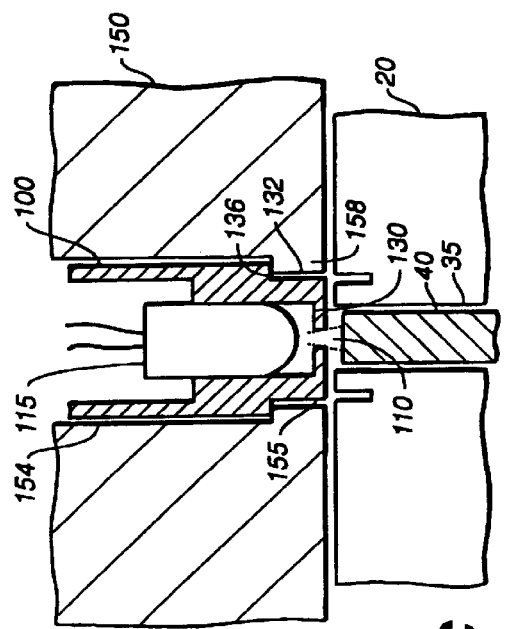
FIG._9C
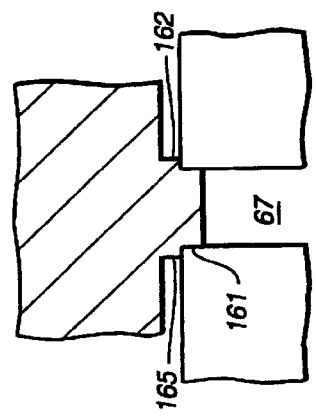
FIG._9B

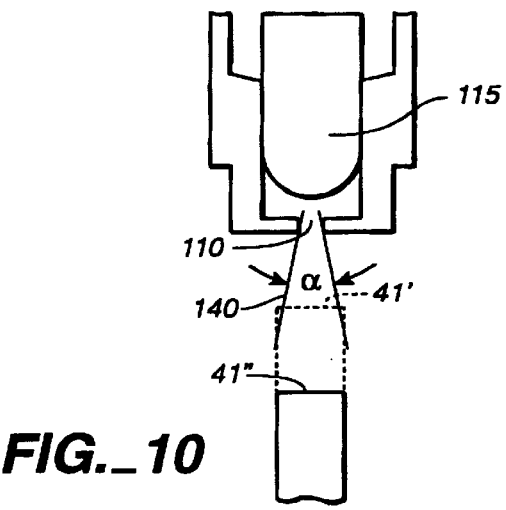
FIG._10
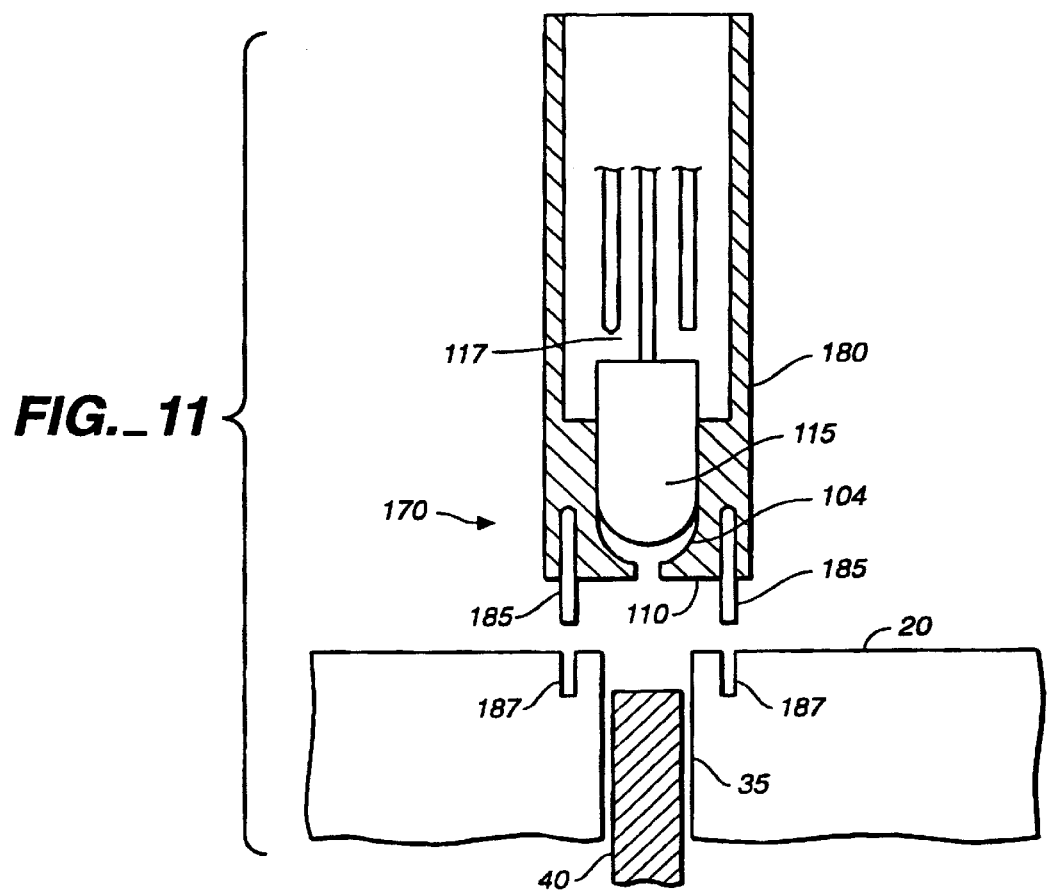
FIG._11

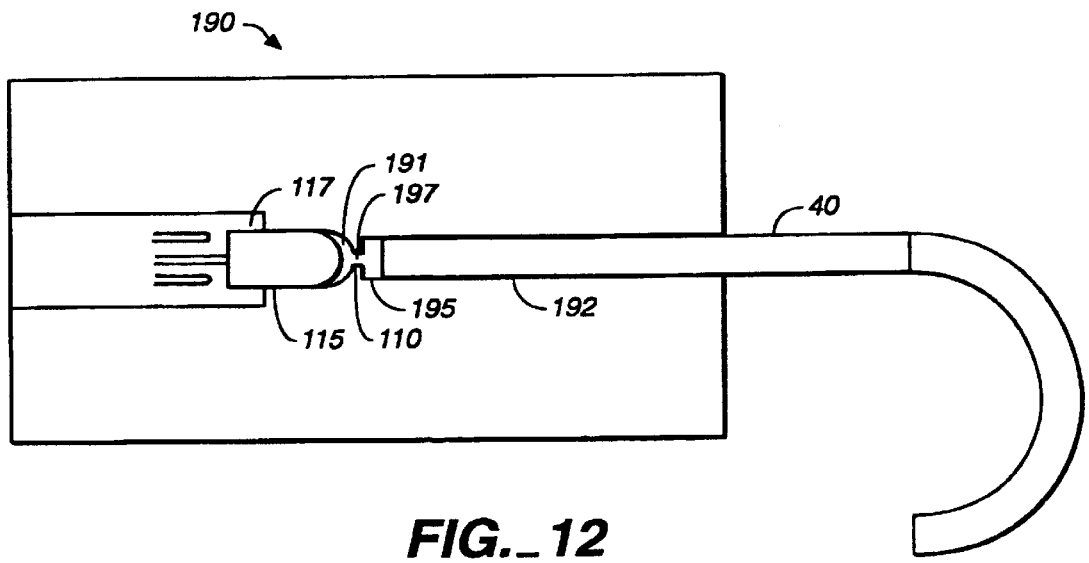
FIG._12
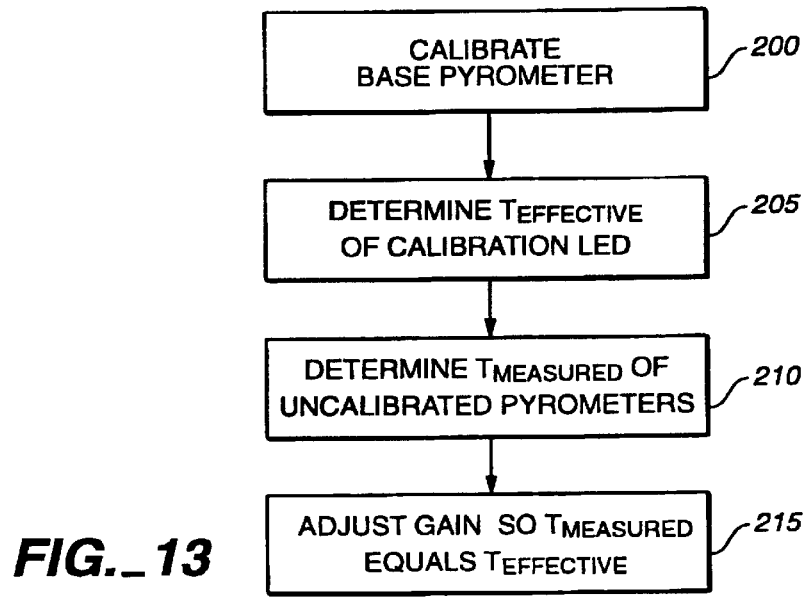
FIG._13

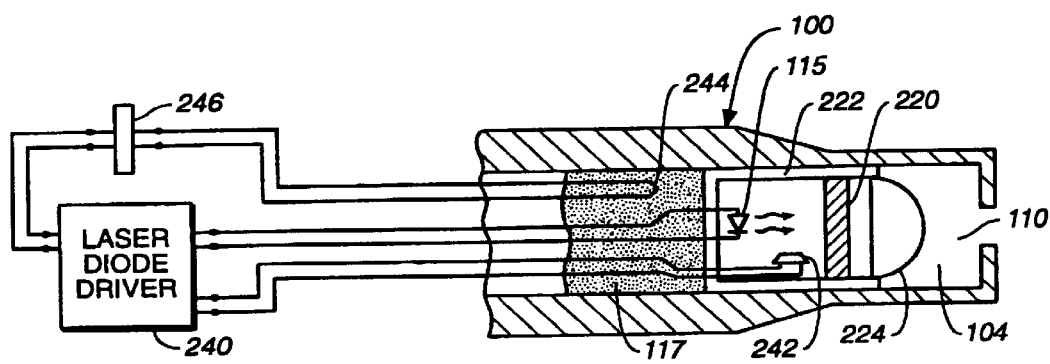
FIG._14
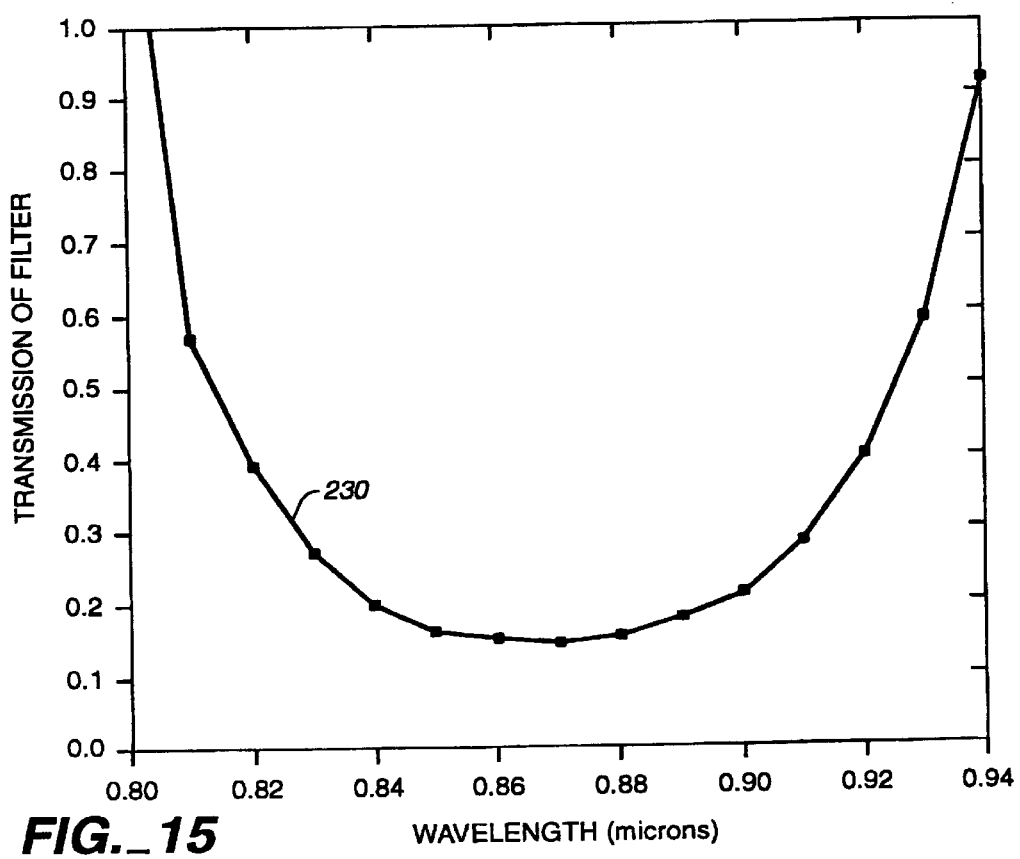
FIG._15

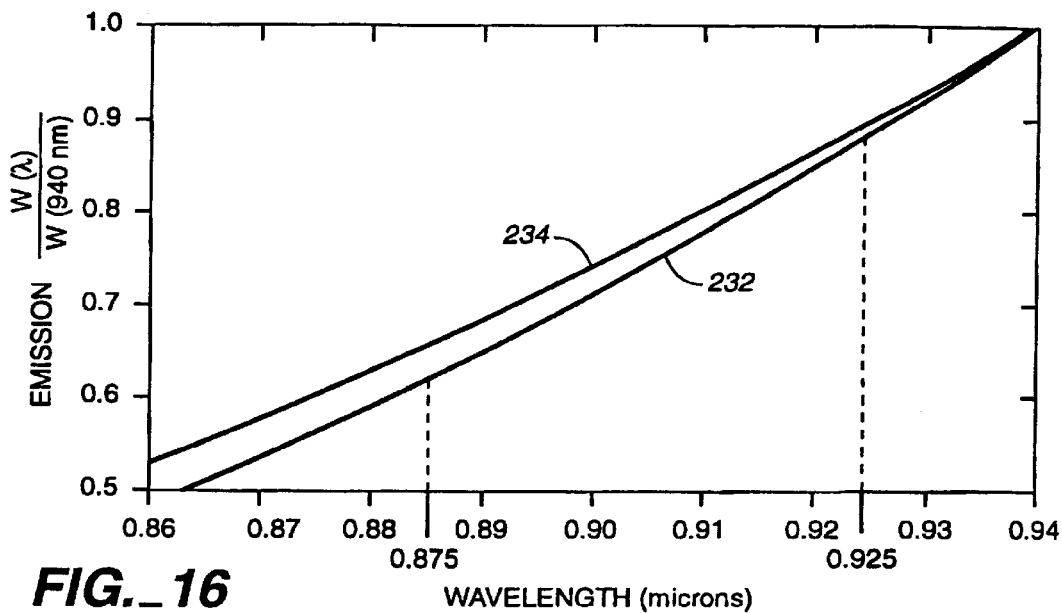
FIG._16
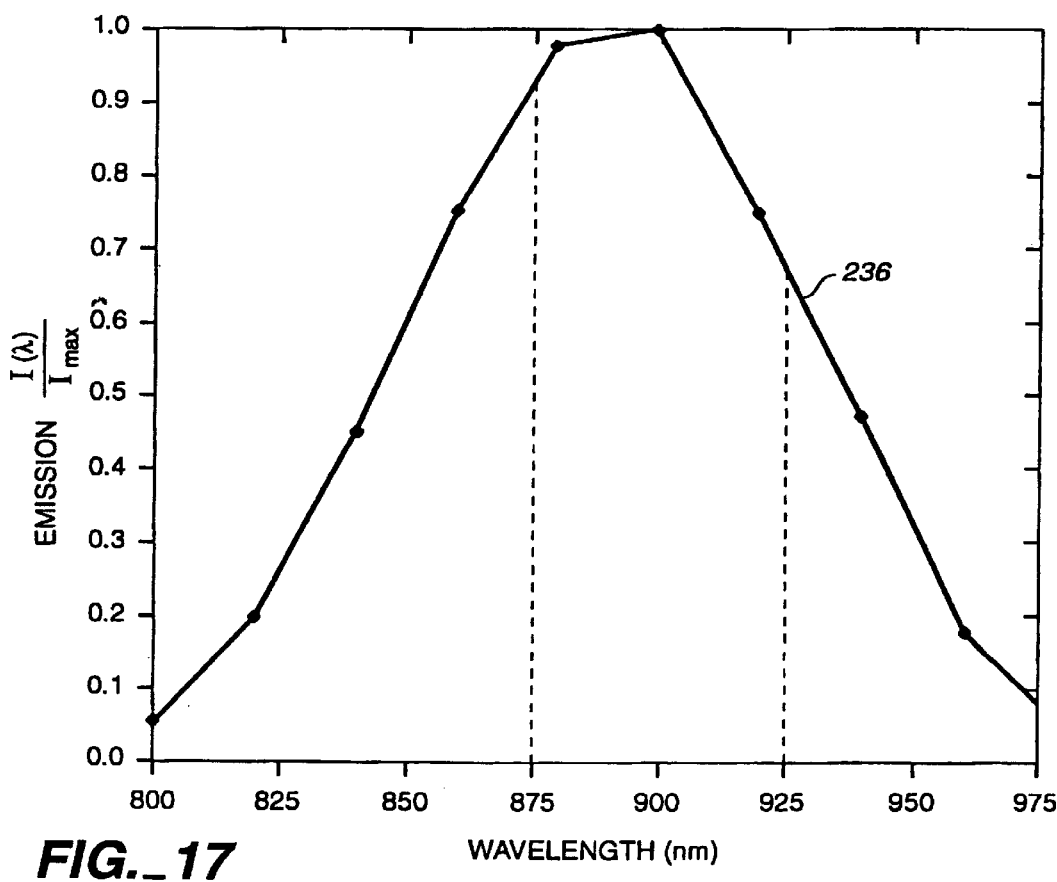
FIG._17

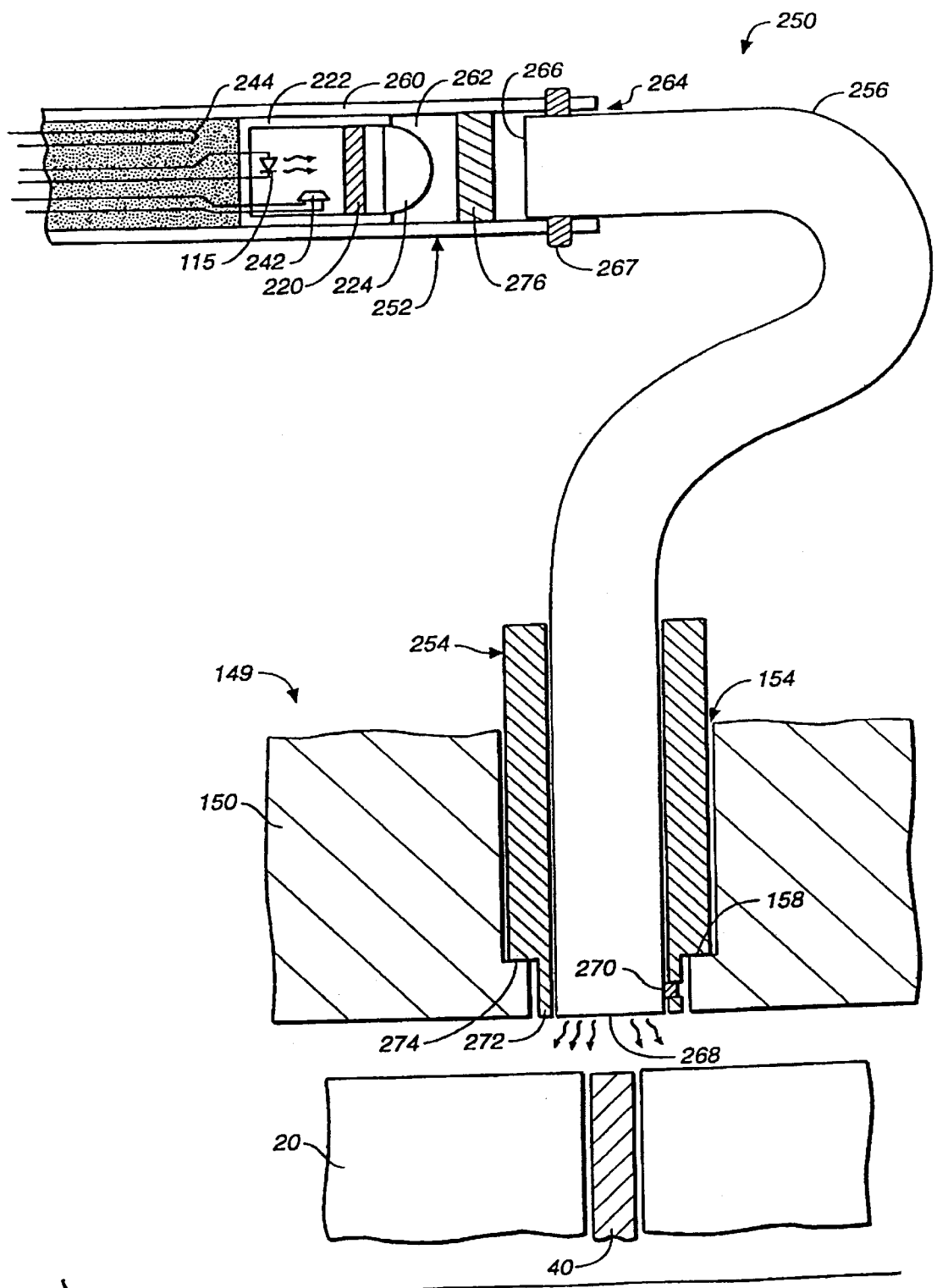
FIG._18

METHOD AND APPARATUS FOR INFRARED PYROMETER CALIBRATION IN A THERMAL PROCESSING SYSTEM

CROSS REFERENCE TO RELATED APPLICATION

This United States patent application is a divisional application of pending U.S. patent application Ser. No. 08/623,433, filed Mar. 28, 1996 which is a Continuation-in-Part of pending U.S. patent application Ser. No. 08/506,902, filed Jul. 26, 1995.

BACKGROUND OF THE INVENTION

The present invention relates to calibrating pyrometers that are used in thermal processing systems.

In rapid thermal processing (RTP), a substrate is heated quickly to a high temperature, such as 1200° C., to perform a fabrication step such as annealing, cleaning, chemical vapor deposition, oxidation, or nitridation. Particularly given the submicron dimensions of current devices, to obtain high yields and process reliability, the temperature of the substrate must be precisely controlled during these thermal processing steps. For example, to fabricate a dielectric layer 60–80 Å thick with a uniformity of ±2 Å, which is typical of requirements in current device structures, the temperature in successive processing runs cannot vary by more than a few ° C. from the target temperature. To achieve this level of temperature control, the temperature of the substrate is measured in real time and in situ.

Optical pyrometry is a technology that is used to measure substrate temperatures in RTP systems. An optical pyrometer using an optical probe samples the emitted radiation intensity from the substrate, and computes the temperature of the substrate based on the spectral emissivity of the substrate and the ideal blackbody radiation-temperature relationship.

When the system is first set up, the optical probe must calibrated so that it produces a correct temperature reading when exposed to the radiation coming from the heated substrate. In addition, during repeated use, the temperature sensed by the probe might change over time and thus it will be necessary to recalibrate the probe or at least detect the change that has occurred so that corrective action can be taken. For example, the light pipe which is used to sample the radiation being emitted from the substrate as it is being heated, may become dirty or chipped, connections along the optical column transferring the sampled light to the pyrometer may loosen, or the electronic components in the pyrometer may "drift".

A commonly used method of calibrating the pyrometer is to use a special substrate or wafer in the chamber. The special substrate, which can be purchased from commercial sources, has a previously measured, known emissivity and it has an "embedded" thermocouple which is attached to the substrate with a ceramic material. When the substrate is heated, its actual temperature is indicated by the thermocouple. Since the substrate's emissivity is known, the radiation that is actually emitted by the substrate can be easily calculated by multiplying the intensity of radiation that would be expected from by an ideal black body that is at the predetermined temperature times the emissivity of the substrate. This is the radiation level that will be sampled by the optical probe of the pyrometer. The pyrometer is adjusted so that it produces a temperature reading that corresponds to the actual temperature.

Unfortunately, this method has drawbacks. The actual temperature of the substrate may in fact be different than the temperature measured by the thermocouple. First, the presence of the embedded thermocouple and the ceramic material causes the area with the thermocouple to have a different temperature than other parts of the wafer, i.e., it disturbs the temperature profile on the substrate. Second, at high temperatures (e.g., 1000° C. as is commonly found in RTP processes) the joint between the wafer and thermocouple tends to degrade, so that after four or five uses the thermocouple readings become unreliable. Because of these shortcomings, this calibration technique cannot really guarantee pyrometer accuracy that is better than ten to fifteen ° C.

In addition, there are difficulties associated with placing a thermocoupled substrate inside the chamber and making electrical connection to the thermocouple.

SUMMARY OF THE INVENTION

In general, in one aspect, the invention features an apparatus for calibrating a temperature probe for a thermal processing chamber. The apparatus features a light source having a stable intensity which is optically coupled to a first end of a fiber optic guide to emit light through a second end of the fiber optic guide during calibration. An alignment mechanism aligns the second end of the fiber optic guide with an input end of the temperature probe. The alignment mechanism includes a first alignment structure to engage a corresponding first alignment feature of the chamber.

Implementations of the invention may include the following features. The fiber optic guide may include a twisted fiber bundle. The light source may be positioned in a cavity in a lighting fixture. The fiber optic guide may be connected to the lighting fixture with the light source positioned to direct light through the first end of fiber optic guide. The alignment mechanism may include a first alignment fixture connected to the second end of the fiber optic guide, and a second alignment fixture, e.g., a disk, having the a plurality of projections adapted to fit a plurality of lift pin holes in a reflector plate. The first alignment fixture may include a second alignment structure, e.g., a step in an outer surface, to engage a corresponding second alignment feature, e.g., a conduit having an annular lip, on the second alignment fixture.

In general, in another aspect, the invention features an apparatus for calibrating a temperature probe that measures a temperature of a substrate during processing within a thermal processing system. The apparatus features a light source optically coupled to a surface to emit light of a predetermined intensity through the surface during calibration. A filter is positioned between the light source and said surface to cause the radiation spectrum emitted from the surface over a predetermined wavelength range to more closely approximate the radiation spectrum of a black body of a predetermined temperature over the predetermined wavelength range. The apparatus also comprises an alignment mechanism for aligning the surface with an input end of the temperature probe.

Implementations of the invention may include the following features. The light source may comprises a light emitting diode (LED). The predetermined wavelength range may be in the infrared, e.g., approximately 0.80 to 0.94 microns. There may be an indicia indicating the predetermined temperature approximated by the surface. The light source may be positioned in a cavity in a lighting fixture. The filter is positioned in the cavity. The surface may comprise an aperture in the lighting fixture or an end of a fiber optic guide.

In general, in another aspect, the invention features a method of calibrating a temperature probe that measures a temperature of a substrate during processing within a thermal processing system. The method features generating light of a stable intensity from a light source, and directing the light to a surface to emit light of a predetermined intensity from the surface during calibration, and aligning the surface with an input end of said temperature probe. The light is filtered by a filter positioned between the light source and the surface to cause the radiation spectrum emitted from the surface over a predetermined wavelength range to more closely approximate the radiation spectrum of a black body of a predetermined temperature over the predetermined wavelength range Among the advantages of the invention are the following. The pyrometer may be accurately (e.g., less than 1° C. error) calibrated without using a wafer with an embedded thermocouple. Calibration may be performed more quickly and using less energy. Calibration may be traced to an absolute standard. The pyrometer may be calibrated without removing the light pipe from the chamber. The calibration instrument may be portable and sturdy.

Other features and advantages will be apparent from the following description and the claims.

BRIEF DESCRIPTION OF THE DRAWINGS

FIG. 1 shows a rapid thermal processing chamber;

FIG. 2 shows a temperature sensing probe;

FIG. 3 shows a temperature sensing probe;

FIG. 4 is a graph of transmission of a pyrometer filter and normalized light intensity of an LED, both as a function of wavelength;

FIG. 5A shows a cross-section of a calibration probe;

FIG. 5B is an enlarged view from FIG. 5A;

FIG. 6 is a circuit diagram of a calibration probe;

FIG. 7 is a top view of an alignment tool;

FIGS. 8A and 8B are cross-sectional views of the alignment tool shown in FIG. 7 taken along lines 8A—8A and 8B—8B, respectively;

FIGS. 8C and 8D are enlarged views from FIG. 8A;

FIG. 9A shows the alignment tool of FIG. 8A with a calibration probe mounted therein;

FIGS. 9B and 9C are enlarged views from FIG. 9A;

FIG. 10 shows the light beam from a calibration probe;

FIG. 11 shows another embodiment of a calibration probe with an alignment tool attached thereto;

FIG. 12 shows yet another embodiment of a calibration instrument;

FIG. 13 is a flow chart of a calibration procedure using the calibration instrument;

FIG. 14 shows still another embodiment of a calibration probe;

FIG. 15 is a graph of the transmission of a calibration filter as a function of wavelength;

FIG. 16 is a graph of the emission of a black body, normalized at 0.94 microns, as a function of wavelength;

FIG. 17 is a graph of the emission of an LED as a function of wavelength; and

FIG. 18 shows even another embodiment of a calibration probe.

DESCRIPTION OF THE PREFERRED EMBODIMENT(S)

Before describing the details of a pyrometer calibration tool which is used to calibrate pyrometers within an RTP system, we will first describe an RTP system which includes the pyrometers that are to be calibrated. Referring to FIGS. 1 and 2, in general an RTP system includes a processing chamber 60 for processing a disk-shaped, eight-inch (200 mm) diameter silicon substrate 10. The substrate 10 is held inside chamber 60 by a substrate support structure 62 and is heated by a heating element 70 (e.g., an array of tungsten halogen lamps) located directly above the substrate. Heating element 70 generates radiation which enters chamber 60 through a water-cooled quartz window 72 located approximately one inch above substrate 10. Beneath substrate 10 is a reflector plate 20 which is mounted on a stainless steel base 65. Reflector plate 20 is made of aluminum and has a highly reflective surface coating 24 (e.g., a gold alloy). The underside of substrate 10 and the top of reflector plate 20 form a reflecting cavity 30 which makes the substrate appear more like an ideal black body, i.e., it produces an increased effective emissivity for the substrate.

A conduit 35 extending from the backside of base 65 through the top of reflector plate 20 holds a sapphire light pipe 40 which acts as the input probe of a temperature probe 15 that includes a pyrometer 50. An input end 22 of light pipe 40 is located near (e.g., flush with) the top of reflector plate 20 and samples radiation from reflecting cavity 30. Sampled radiation passes down light pipe 40, through a flexible optical fiber 45, and into pyrometer 50. The coupled ends of optical fiber 45 and sapphire light pipe 40 are held in close optical contact with each other by a threaded connector 42. There are a plurality of temperature probes 15 (e.g., eight) positioned in reflector plate 20 to sample radiation at different radii of the substrate.

In the described embodiment, sapphire light pipe 40 is about 0.05 to 0.125 inches in diameter (e.g., 0.080) and pyrometer 50 is a Luxtron Accufiber Model 100. A more complete description of an RTP system along with an explanation of how the reflecting cavity acts to produce a virtual black body may be found in pending U.S. patent application Ser. No. 08/359,302 filed Dec. 19, 1994, entitled A METHOD AND APPARATUS FOR MEASURING SUBSTRATE TEMPERATURES, assigned to the assignee of the present application, and incorporated herein by reference.

Referring to FIG. 3, pyrometer 50, radiation from optical fiber 45 passes first through an optical pyrometer filter 52 before falling onto a silicon detector 54 (e.g., photodiode). The signal from detector 54 is input to control electronics 56 which converts that signal to a temperature reading $T_{out}$ which is used by power control circuitry (not shown) for the lamps. Control electronics 56 includes a lookup table (not shown) that it uses to convert the measured current into a output temperature reading $T_{out}$. The lookup table, which maps measured output signal to the corresponding temperature of an ideal black body can be readily derived from Planck's law, in a manner well known to persons skilled in the art. Control electronics 56 also includes a gain control terminal by which the gain of the control electronics may be adjusted during calibration so that pyrometer outputs an accurate temperature reading.

In normal operation, the heating element 70, such as a lamp array, directs radiation to substrate 10. Some of that radiation (i.e., radiation 74) is absorbed by the substrate and some of it (i.e., radiation 75) is transmitted through the substrate into cavity 30. Substrate also emits radiation 76 the intensity of which is a function of the temperature of the substrate. Typically, a silicon wafer transmits radiation with a wavelength greater than about 1.0 microns; whereas, silicon detector 54 responds to radiation having a wavelength up to 1.5 microns. If transmitted radiation is permitted to reach silicon detector 54, it will produce an erroneous temperature reading. Therefore, to prevent transmitted radiation from reaching detector 54 and interfering with the temperature measurement, the bandpass characteristics of pyrometer filter 52 are selected to prevent the transmitted radiation from the lamps from reaching the detector. In the described embodiment, pyrometer filter 52 is glass coated with an optical stack, e.g., a quarter-wave stack, which transmits light in a narrow range of wavelengths (e.g. 0.89 to 0.93 microns) and has very high rejection above 1.0 microns. The transmission of pyrometer filter 52 as a function of wavelength is shown by dashed line 52a in FIG. 4.

To calibrate the pyrometer, a special calibration instrument is used (see FIGS. 9A–9C, 11, and 12). The calibration instrument includes a stable light source, such as a light emitting diode (LED), which emits radiation primarily in the narrow spectrum defined by pyrometer filter 52. The stable light source simulates a black-body at a predetermined temperature. That is, it emits the same amount of radiation over the spectrum of interest as would a black body that is heated to the predetermined temperature. The calibration instrument, several embodiments of which are described below, aligns the light source with the input end of the sapphire light pipe so that a known and repeatable amount of radiation enters the sapphire light pipe during each calibration run.

The light source is constructed and/or selected to "match" pyrometer filter 52. That is, its maximum output and its spectral range coincide with the bandpass region of pyrometer filter 52. Referring to FIG. 4, the characteristics of an LED that is used with the previously described pyrometer filter 52 are shown by solid line 115a. The LED has an approximately gaussian spectral distribution which is about 0.2 microns wide with a maximum intensity at about 0.89 microns.

Referring to FIG. 14, a calibration filter 220 may be placed between LED 115 and aperture 110 so that calibration probe 100 simulates a black body. That is, calibration filter 220 causes the light emitted from the calibration probe to have the same relative intensity, as a function of wavelength, as a black body of a predetermined temperature. The calibration filter may be positioned inside a shell 222 of the LED, e.g., between a lens 224 and diode element 115. Alternately, calibration filter 220 may be positioned in cavity 104 in calibration probe 100 between lens 224 and aperture 110.

The transmission characteristics of calibration filter 220 are selected, as will be described below, to compensate for the difference between LED 115 and an ideal black body. Referring to FIG. 15, the transmission curve, i.e., the transmission as a function of wavelength, of calibration filter 220 is shown by solid line 230. The transmission curve 230 of calibration filter 220 is approximately parabolic, with a minimum transmission (e.g., about 0.15) at a wavelength of about 0.87 microns. Calibration filters with specified transmission curves may be ordered from filter manufacturers. When light from LED 115 passes through calibration filter 220, the resulting light intensity simulates a black body at a predetermined temperature, e.g., 950° C., over most of the spectral emission range of the LED, e.g., from 0.80 to 0.94 microns.

The transmission curve of calibration filter 220 is derived from the emission curves, i.e., the light intensity as a function of wavelength, of a black body and the LED. Specifically, the transmission curve of calibration filter 220 is calculated by dividing the emission curve of a black body by the emission curve of LED 115. The emission curve of a black body at a predetermined temperature may be derived from Plank's law. Referring to FIG. 16, the emission curve for a black body at a temperature of 950° C. is shown by solid line 232, whereas the emission curve for a black body at a temperature of 1050° C. is shown by solid line 234. Emission curves 232 and 234 have been normalized at 0.94 microns, i.e., the light intensity at wavelengths below 0.94 microns is shown as a percentage of the light intensity at 0.94 microns. The emission curve of LED 115 may be measured by a spectrograph. Referring to FIG. 17, the emission curve of one LED, specifically an OD88FHT driven at 30 watts, in calibration instrument 100 is shown by solid line 236. To generate transmission curve 230 for calibration filter 220 in calibration probe 100 to simulate a predetermined temperature of 950° C., black body emission curve 232 is divided by LED emission curve 236.

Calibration filter 220 enables different pyrometers, particularly pyrometers with differing pyrometer filters 52, to be accurately calibrated with the same calibration instrument. The transmission curves of pyrometer filters 52 differ from pyrometer to pyrometer. For example, one pyrometer filter may transmit light have wavelengths between 0.92 and 0.93 microns, whereas another pyrometer filter may transmit light having wavelengths between 0.87 and 0.88 microns. Calibration filter 220 causes calibration instrument 100 to simulate the same temperature at all wavelengths of interest, i.e., over most of the emission range of the LED.

A calibration instrument without calibration filter 220 cannot simulate a single temperature at all wavelengths of light. As shown by FIG. 17, the emission curve of light source 115 does not match a black body curve. Specifically, the relative intensity of light source 115 at two different wavelength ranges does not match the relative intensity of a black body. For example, as shown in FIG. 16, a black body has a higher intensity at a wavelength of 0.925 microns than at a wavelength of 0.875 microns, whereas, as shown in FIG. 17, light source 115 has a lower intensity at a wavelength of 0.925 microns than at a wavelength of 0.875 microns. Therefore, if light source 115 generates the correct amount of radiation to simulate a black body at a predetermined temperature, e.g., 950° C., at one wavelength range, e.g., 0.87 to 0.88 microns, the light source cannot simulate a black body of the same temperature at a different wavelength range, e.g., 0.92 to 0.93 microns.

Because pyrometer filters 52 have different transmission ranges, a light source which simulates a black body at a predetermined temperature for one pyrometer will not simulate the same temperature for another pyrometer with a different pyrometer filter. However, adding calibration filter 220 causes calibration instrument 100 to generate the correct relative intensity of light to simulate a black body of a single temperature at all wavelengths of interest, thereby making the simulated temperature independent of the transmission range of pyrometer filter 52. This permits pyrometers with different pyrometer filters to be properly calibrated with the same calibration instrument.

Referring to FIGS. 5A and 5B, a calibration probe 100 which simulates a black body at a known temperature includes a generally cylindrical body 102 having an internal cavity 104. One end of cylindrical body 102 is closed, except for a small channel 110 defining an aperture through which light can pass out of cavity 104. A light emitting diode (LED) 115 positioned in cavity 104 emits light that passes out through channel 110.

In the described embodiment, body 102 is a machined aluminum cylindrical tube, 0.3745 inches in diameter and 2.0 inches long. Channel 110 extends between a bottom surface 130 of body 102, and cavity 104. The channel is about 0.02 inches in diameter by about 0.02 inches long and is centered on the axis of the cylindrical body 102. At the end of body 102 in which channel 110 is located there is a narrower cylindrical region 132 having a diameter of about 0.30 inches and a length of about 0.10 inches. A circular outer edge 134 of the cylindrical body 102 surrounding an annular rim 136 is beveled at a 45° angle to make it easier to insert the calibration probe into an alignment tool that is described below.

Since the light output of the LED 115 varies as a function of temperature, means are also provided to stabilize the temperature of the LED. In particular, calibration probe 100 also includes a small heating resistor 122, such as a fifty Ω resistor and a thermocouple 124, such as a K-type thermocouple, placed in close proximity to LED 115. Heater 122 is used to heat the LED up to about 80° F., i.e., slightly above the expected ambient temperature. Alternatively, the LED could be cooled to a temperature below ambient. However, cooling would be a more difficult and costly alternative.

All three components (i.e., LED 115, thermocouple 124 and heater 122) are secured in place by a thermoconductive ceramic 117, such as Azemco ceramiccast 583. Ceramic 117 ensures that the heat from heater 122 is efficiently transmitted to LED 115 and thermocouple 124. Ceramic 117 also holds the position of LED 115 constant relative to channel 110 so that no changes in light intensity occur due to shifting or rotation of LED 115 inside cavity 104.

Referring to FIG. 6, a power supply 120 supplies a constant current to LED 115. In the described embodiment, power supply 120 uses a laser diode (not shown) in a manner well known to those skilled in the art to stabilize the current through LED 115 and thereby stabilize its light output. Alternatively, the output power of LED 115 can be stabilized by using a photodiode 128 positioned so as to sample the light output of LED 115. In that case, the photodiode is connected through a feedback circuit 129 to power supply 120 to produce a constant light output from LED 115.

Thermocouple 124 and heater 122 are connected to a proportional integrated device (PID) controller 126 to form a feedback circuit to stabilize the temperature of LED 115. By holding both the temperature of LED 115 and current through LED 115 constant, LED 115 generates radiation with a very stable intensity.

Alternately, as shown in FIG. 14, the light output of LED 115 can be stabilized by using a laser driver 240 in conjunction with a photodiode 242 and a thermocouple 244. The driving power output of laser driver 240 is connected to the power input of LED 115. Photodiode 242 is positioned inside the casing of the LED to sample its light intensity and generate an intensity signal. The intensity signal from the photodiode is fed back into laser driver 240 to form a feedback loop so that the light output of calibration instrument 100 is extremely stable.

As noted above, the light output of the LED varies as a function of temperature. In particular, as the temperature of LED 115 increases, its light output drops. The output signal from thermocouple 244 may be connected through a coupler 246 to a modulation input of laser driver 240. Couple 246 converts a signal of intensity x into a signal of intensity y according to the equation y=a−bx. The slope b and offset a of coupler 246 are set in a manner well known to those of skill in the art so that as the temperature of the LED drops, the power output of laser driver 240 increases, and the light output of the LED remains constant.

During calibration, an alignment tool is used to align calibration probe 100 with the light pipe of the temperature probe being calibrated. We shall give examples of two design types for this alignment tool. One design type is used in situ. That is, it aligns calibration probe 100 with light pipe 40 without having to remove the light pipe from the system. The other design type is used to perform the calibration remotely. That is, light pipe 40 is removed from the RTP chamber and inserted into the alignment tool.

Referring to FIGS. 7, 8A–8D, and 9A–9C, an alignment tool 149 according to an embodiment which is used for in situ calibration is adapted to fit into the RTP chamber above the reflector plate. When inserted into the RTP chamber, alignment tool 149 holds the calibration probes in a fixed position relative to the light pipes. More specifically, alignment tool 149 is a circular disk 150 with an arrangement of holes 154 into which individual calibration probes 100 can be inserted. The number of holes or conduits 154 through the disk coincides with the number of thermal probes that are in the reflector plate. Holes 154 are located at different radii from the center of disk 150 and are positioned so that they coincide and are aligned with the locations of the conduits 35 in reflector plate 20 when alignment tool 149 is inserted into position within the chamber. As is shown most clearly in FIG. 8D, at the bottom of each small hole 154 there is an annular lip 158 defining a smaller diameter hole 155. Hole 155 has a diameter that is slightly larger than the diameter of the narrower cylindrical region 132 at the bottom of calibration probe 102 and lip 158 has a thickness that is equal to the length of the narrower cylindrical region 132 on calibration probe 100 (see FIG. 5b). Thus, as shown in FIG. 9C, when calibration probe 100 is inserted into a hole 154, it comes to rest with rim 136 against lip 158 and with its bottom surface 130 substantially flush with the bottom of disk 150 (i.e., flush with the surface of disk 150 that is proximate to the reflector plate when it is installed within the RTP chamber during a calibration).

In the described embodiment, alignment tool 149 is made of plastic or nylon, e.g., Delrine. It is about 1.0 inch thick and 8.9 inches in diameter. Each of holes 154 has an inside diameter of about 0.375 inches, which is slightly larger than the outside diameter of cylindrical body 102 so that calibration probe 100 can be easily inserted into the hole. Annular lip 158 is about 0.11 inches thick and projects inward by 0.047 inches, so that the inner diameter of smaller hole defined by annular lip 158 is about 0.328 inches.

Returning to FIGS. 7, 8A and 8B, three projections 156 (only two are shown in the cross-sectional views of FIGS. 8A and 8B) are located on the underside of disk 150. These projections 156 are spaced equidistant from each other around a circle with its center coinciding with the center of disk 150 and they are positioned so as to align with lift pin holes located in the reflector plate in the RTP chamber when alignment tool 149 is inserted into the RTP chamber. As shown in FIG. 8C, each projection 156 has a cylindrical lower portion 161 with a first diameter and a cylindrical upper portion 165 with a larger second diameter to thereby form an annular step 162 at the point of transition from lower portion 161 to upper portion 165. The first diameter is slightly smaller than the diameter of the corresponding lift pin hole in the reflector plate and the second diameter is larger than the diameter of the lift pin hole. Annular step 162 is about 0.01 to 0.04 (e.g. 0.03) inches away from the bottom face of disk 150. Thus, as shown in FIG. 9B, when alignment tool 149 is inserted into the RTP chamber, lower portions 161 slide into their corresponding lift pin holes 67 in the reflector plate and annular steps 162 hold the bottom face of disk 150 at a distance of about 0.03 inches above the surface of the reflector plate.

Referring to FIGS. 7 and 8A disk 150 also includes three larger holes 152 (only one shown in the cross-sectional view of FIG. 8A), each located at a short distance radially inward from a corresponding one of projections 156. These holes 152, which are about 0.75 inches in diameter, enable the user to see the location of the lift pins holes in the reflector plate when the alignment tool is being inserted into the RTP chamber. On the top side of disk 150, there is also a handle 160 with which the technician can lift and manipulate the disk as it is being inserted into the RTP chamber.

As shown in FIGS. 9A and 9C, calibration probe 100 is inserted into small hole 154. When the alignment tool is fully assembled into the RTP chamber, each small hole 154 and the calibration probe 100 which it contains will be aligned with a corresponding one of the sapphire light pipes 40. By inserting a calibration probe 100 into each of the eight holes 154, the eight pyrometers 50 may be calibrated simultaneously. Alternatively, a single calibration probe 100 can be used and moved from one hole to the next for each calibration.

When calibration probe 100 is positioned above a light probe by the alignment tool, there is typically about a 0.03 inch clearance between bottom surface 130 of calibration probe 100 and the top of light pipe 40. Light pipe 40 is shown in FIG. 10 in two positions. One position has its top surface 41' close to calibration probe 100 and the other position has its top surface 41" further from calibration probe 100. Light emerges in a beam 140 from channel 110 with a spread angle α of about 90°. The exact angle α, of course, depends on the length and diameter of channel 110 and the position of LED 115 inside cavity 104. It is desirable that bottom surface 130 of calibration probe 100 be close enough to surface 41' so that the coverage of beam 140 will not expand to an area that is larger than the top surface of light pipe by the time it reaches light pipe 40. In other words, calibration probe 100 should be close enough to light pipe 40 so that light pipe 40 captures substantially all of the light coming from calibration probe 100. If that condition is satisfied, the temperature probe will be relatively insensitive to small changes in distance and alignment between calibration probe 100 channel and light pipe 40. In contrast, if calibration probe 100 is too far from light pipe 40 (e.g. more than about 0.1 inches for the described embodiment), as indicated by surface 41", then the coverage of beam 140 will be larger than the diameter of the light pipe, which consequently will only capture a fraction of beam 140. The fraction which it captures will be quite sensitive to both alignment and the distance between calibration probe 100 and the reflector plate.

To calibrate pyrometer 50, disk 150 is lifted by handle 160 and placed in chamber 60 so that projections 156 fit into lift pin holes 67. Calibration probes 100 are fit into small holes 154, the LED of each calibration probe is activated, and the temperatures sampled by pyrometers 50 are recorded. The uncalibrated measurements are compared to the black-body temperatures that calibration probes 100 are known to simulate.

Another embodiment of the alignment tool which is also used for in situ calibration is shown in FIG. 11. Alignment tool 170 is partially integrated with a calibration probe 180 that is of a slightly different design than the previously described calibration probe. In this case, calibration probe 180 is a cylindrical tube of uniform diameter throughout (i.e., without the narrower cylindrical region 132 shown in FIG. 5). Two alignment pins 185 project away from bottom surface 130. Pins 185 slide into corresponding holes 187 located in the surface of reflector plate 20 on both sides of light pipe 40. When pins 185 are inserted into matching holes 187, channel 110 is aligned with light pipe 40. In this embodiment, calibration probe 180 is about 1.5 inches long and 0.5 inches in diameter and pins 185 are each 0.30 inches long and 0.024 inches in diameter.

An embodiment which is used to calibrate temperature probes that have been removed from the RTP system is shown in FIG. 12. In this embodiment, the calibration probe is replaced by a fixture 190 which has a cavity 191 in which LED 115 is mounted. Fixture 190 also includes a conduit 192 which aligned along the axis of cavity 191 and sized to receive a light pipe 40 for calibration. A wall 195 with a narrow aperture 197 separates cavity 191 from conduit 192. Aperture 197, like channel 110 in the previously described embodiments, allows light from LED 115 to pass through into conduit 192 where the light pipe that is being calibrated is located. The rest of the calibration probe including the electronics and the temperature stabilization circuitry are as previously described.

Another embodiment of the calibration instrument is shown in FIG. 18. In this embodiment, calibration probe 250 includes a lighting fixture 252, an alignment fixture 254, and a fiber optic guide 256 connecting the lighting fixture to the alignment fixture. Lighting fixture 252 includes a generally cylindrical body 260 having an internal cavity 262. A light source, such as LED 115 in casing 222, is placed inside cavity 262. An input end of fiber optic guide 256 is inserted into an opening 264 in the cylindrical body so that an input face 266 is positioned to receive light from the LED. The fiber optic guide 256 is secured in the cavity by set screws 267 or some other mechanical or adhesive or connector. Other optical components, such as calibration filter 220 or lens 224 may be positioned between the LED and the fiber optic guide. In addition, a diffused glass filter 276 which transmissively scatters light may be inserted between LED 115 and input face 266. The electronic control of LED 115 is as previously described with reference to FIG. 14.

Light radiated by LED 115 enters fiber optic guide 256 through input face 266 and travels through the fiber optic guide to an output face 268. Fiber optic guide 256 is a twisted bundle of quartz optical fibers. The entire twisted bundle is about three or four millimeters in diameter, and the individual quartz optical fibers are about fifty microns in diameter. In a twisted bundle of fibers, the individual quartz fibers are "tangled", i.e., they cross paths, so that the relative position of a fiber at input face 266 need not match the relative position of the same quartz fiber at output face 268. Thus, the light which enters the bundle through input face 266 is "randomized", i.e., redistributed, at output face 268. Consequently, after the unevenly distributed light from LED 115 passes through fiber optic guide 256, the light intensity across output face 268 is evenly distributed.

The output end of fiber optic guide 256 is secured in alignment fixture 254 by set screws 270, although other mechanical or adhesive methods of connection could be used. Alignment fixture 254 is a machined aluminum cylindrical tube about two inches long and one-third of an inch in diameter. Both ends of the cylindrical tube are open, and fiber optic guide 256 extends through the tube so that output face 268 is flush with the lower aperture. In other respects, the alignment fixture is similar in construction to the calibration probe described with reference to FIGS. 5A and 5B. Specifically, the lower end of the exterior surface of alignment fixture 254 includes a narrow cylindrical region 272 and an annular step 274.

Alignment fixture 254 is inserted into small hole 154 of alignment tool 149 so that annular step 274 of the alignment fixture rests against lip 158 of the alignment tool and output face 268 of the fiber optic guide is substantially flush with the bottom of disk 150. In this configuration, the output face of the fiber optic guide is positioned above and aligned with sapphire light pipe 40. Light from LED 115 passes through the fiber optic guide and is sampled by the light pipe 40.

The output face of the fiber optic guide simulates a black body substrate placed in front of the light pipe. A black body substrate has a large surface area in comparison to the sampling area of light pipe 40, and the surface of the substrate radiates light in all directions. Similarly, the output face 268 of fiber optic guide 256 emits radiation over a relatively wide area in comparison to the sampling area of the light pipe, and the radiation emerging from output face 268 has a wide angular spread. In addition, the intensity of LED 115 is set so that calibration probe 250 emits the same amount of radiation as would a black body that is heated to a predetermined temperature. Therefore, calibration instrument 250 simulates a black body substrate at a predetermined temperature.

A method for calibrating pyrometers 50 using the above-described embodiments is shown in FIG. 13. First, a reference pyrometer is calibrated to correctly read black body temperatures (step 200). This can be done with the assistance of a standards organization, such as, for example, the National Institute of Standards and Technology (NIST) which has available calibrated sources for generating an accurately known black-body radiation spectrum for a given temperature. The reference pyrometer is calibrated to produce an accurate temperature reading from the black body reference standard.

With an accurately calibrated reference pyrometer, the effective black-body temperature $T_{eff}$ that is generated by a calibration instrument is then measured (step 205). Note that it is likely that each calibration probe will simulate a slightly different black body temperature due to differences in electronics, the positioning of LED 115 inside cavity 104, etc. Thus, each calibration probe should be measured individually and labeled with indicia indicating the temperature which it simulates. For example, one calibration probe 100 might simulate 843° C.; whereas, another calibration probe might simulate 852° C.

The calibration probe can be labelled in a number of ways. A label 203 (see FIG. 5B) with the simulated temperature might be directly affixed to the probe. Alternately, the probe might be affixed with a part number, code, or other identifying marker. In this case, the part number, code, or identifying marker might be indexed to the simulated temperature in a separate list.

The calibration instruments are then used to calibrate the uncalibrated thermal probes (step 210). Specifically, using the alignment tool, the calibration probe is aligned with the light pipe 40, the LED 115 is activated, and a temperature $T_m$ that is produced by the pyrometer 50 is read.

Finally, the gain of the pyrometer is adjusted to produce a measured temperature $T_m$ that equals $T_{eff}$, i.e., the black body temperature that is simulated by the calibration probe (step 215).

In summary, the reference pyrometer is calibrated to the standard at the NIST, the calibration probes are calibrated to the reference pyrometer, and the pyrometers are calibrated to the calibration probes. Therefore, the calibration of the pyrometers may be traced back to the standard. Since the standard is an accurate black body temperature source, the pyrometer temperature measurements are also accurate.

In the case of in situ calibrations, the calibration instrument can also be used to detect when thermal probes within a chamber have gone out of calibration due to particle contamination, drifting electronics, or whatever. The measured temperature $T_m$ from the calibration probe can be compared with the known effective temperature $T_{eff}$ of the calibration probe. If the difference $T_{eff}-T_m$ exceeds a predetermined threshold, the thermal probes can be cleaned, recalibrated, or simply replaced.

Other embodiments are within the scope of the following claims. For example, though the above-described embodiment used an LED as the light source, other stable light sources, such as a laser diode with appropriate stabilization control circuitry, can be used.

What is claimed is:

1. An apparatus for calibrating a temperature probe for a thermal processing chamber, comprising:
   a) a light source having a stable intensity;
   b) a fiber optic guide, said light source optically coupled to a first end of said fiber optic guide to emit light through a second end of said fiber optic guide during calibration; and
   c) an alignment mechanism for aligning the second end of said fiber optic guide with an input end of said temperature probe, said alignment mechanism including a first alignment structure to engage a corresponding first alignment feature of said chamber.

2. The apparatus of claim 1 wherein said fiber optic guide includes a twisted fiber bundle.

3. The apparatus of claim 1 further comprising a lighting fixture having a cavity, wherein said light source is positioned in said cavity.

4. The apparatus of claim 3 wherein said fiber optic guide is connected to said lighting fixture and said light source is positioned in said cavity to emit light through the first end of said fiber optic guide.

5. The apparatus of claim 1 wherein said alignment mechanism includes:
   a first alignment fixture connected to the second end of said fiber optic guide, and
   a second alignment fixture having said first alignment structure, wherein
     said first alignment fixture includes a second alignment structure to engage a corresponding second alignment feature on said second alignment fixture.

6. The apparatus of claim 5 wherein said second alignment feature comprises a conduit having an annular lip, and said second alignment structure comprises a step in the outer surface of said first alignment fixture to catch against said annular lip.

7. The apparatus of claim 6 wherein said second alignment fixture comprises a disk and said conduit extends through said disk.

8. The apparatus of claim 7 wherein said first alignment structure includes a plurality of projections extending from the bottom of said disk and said first alignment feature includes a plurality of lift pin holes in a reflector plate in said chamber.

9. The apparatus of claim 1, wherein the alignment mechanism is configured to align a plurality of calibration devices with respect to a plurality of temperature probes to enable the plurality of temperature probes to be calibrated simultaneously.

10. The apparatus of claim 1, wherein the first alignment structure is constructed and arranged to support the second end of the fiber optic guide a support distance above a surface of the thermal processing chamber.

11. The apparatus of claim 10, wherein the support distance is selected so that substantially all of the light emitted through the second end of the fiber optic guide is captured by the input end of the temperature probe.

12. The apparatus of claim 1, wherein the alignment mechanism has a support constructed to removably receive the second end of said fiber optic guide and to align the second end of said fiber optic guide with an input end of said temperature probe.

13. An apparatus for calibrating a temperature probe configured to receive light through an optical channel which extends to an inner surface of a thermal processing chamber, comprising:

a calibration device aligner having a bottom end with one or more projections configured to engage one or more features of the inner surface of the thermal processing chamber, the calibration device aligner comprising a device support constructed to support a calibration device in alignment with the temperature probe when the bottom end of the calibration device aligner is engaged with the features of the inner surface of the thermal processing chamber.

14. The apparatus of claim 13, wherein the calibration device aligner has a top end, and the device support includes a support channel constructed to receive the calibration device.

15. The apparatus of claim 13, wherein the calibration device aligner has a top end, and the device support includes a support channel constructed to receive an alignment fixture coupled to a fiberoptic guide of the calibration device.

16. The apparatus of claim 13, wherein the one or more projections of the calibration device aligner are constructed and arranged to support the bottom end of the calibration device aligner a support distance above a surface of the thermal processing chamber.

17. The apparatus of claim 16, wherein the support distance is selected so that substantially all of the light emitted through the second end of the fiber optic guide is captured by the input end of the temperature probe.

* * * * *